(12) United States Patent
Hara

(10) Patent No.: US 9,532,020 B2
(45) Date of Patent: Dec. 27, 2016

(54) CALIBRATION APPARATUS, PROJECTOR AND CALIBRATION METHOD

(71) Applicant: Takayuki Hara, Kanagawa (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/651,107

(22) PCT Filed: Dec. 24, 2013

(86) PCT No.: PCT/JP2013/085306
§ 371 (c)(1),
(2) Date: Jun. 10, 2015

(87) PCT Pub. No.: WO2014/104383
PCT Pub. Date: Jul. 3, 2014

(65) Prior Publication Data
US 2015/0319415 A1 Nov. 5, 2015

(30) Foreign Application Priority Data

Dec. 28, 2012 (JP) ................................ 2012-286438

(51) Int. Cl.
*G01J 1/10* (2006.01)
*H04N 9/31* (2006.01)
(Continued)

(52) U.S. Cl.
CPC ........... *H04N 9/3185* (2013.01); *G01B 11/002* (2013.01); *G01B 11/2504* (2013.01);
(Continued)

(58) Field of Classification Search
CPC ............... G01B 11/002; G01B 11/2504; G01B 11/2509; G03B 17/54; G09G 2320/0693
(Continued)

(56) References Cited

U.S. PATENT DOCUMENTS 5,991,437 A * 11/1999 Migdal .............. G01B 11/2504
348/139
6,044,170 A * 3/2000 Migdal .............. G01B 11/2518
250/559.23
(Continued)

FOREIGN PATENT DOCUMENTS

JP 2000-284363 10/2000
JP 2001-320652 11/2001
(Continued)

OTHER PUBLICATIONS

Zhengyou Zhang, "A Flexible New Technique for Camera Calibration" IEEE Transactions on Pattern Analysis and Machine Intelligence, vol. 22, No. 11, Nov. 2000.
(Continued)

*Primary Examiner* — Hoa Pham
(74) *Attorney, Agent, or Firm* — Oblon, McClelland, Maier & Neustadt, L.L.P.

(57) ABSTRACT

A calibration apparatus calibrating a projection unit projecting light-rays includes: an imaging unit taking an image of a surface of an object having a location and an attitude, the light-rays projected onto the surface by the projection unit; a location-and-attitude estimation unit estimating the location and the attitude of the surface based on the image; a reflection-point estimation unit estimating, based on the estimated location and the attitude, a reflection point at which one of the light-rays is reflected by the surface; and an identification unit identifying both a passing point that the one of the light-rays passes and a direction in which the one of the light-rays passes the passing point, or identifying only the direction, based on multiple reflection points obtained by the reflection-point estimation unit with respect to multiple different locations and/or multiple different attitudes of the surface.

14 Claims, 13 Drawing Sheets

(51) Int. Cl.

| | | |
|---|---|---|
| *G01M 11/02* | (2006.01) | |
| *G01B 11/00* | (2006.01) | |
| *G01J 1/42* | (2006.01) | |
| *G01B 11/25* | (2006.01) | |
| *G03B 21/14* | (2006.01) | |
| *G09G 3/00* | (2006.01) | |
| *G03B 17/54* | (2006.01) | |
| *G03B 43/00* | (2006.01) | |
| *H04N 5/74* | (2006.01) | |
| *G03B 21/00* | (2006.01) | |

(52) U.S. Cl.
CPC .......... *G01J 1/4257* (2013.01); *G01M 11/02* (2013.01); *G03B 17/54* (2013.01); *G03B 21/005* (2013.01); *G03B 21/14* (2013.01); *G03B 43/00* (2013.01); *G09G 3/002* (2013.01); *H04N 5/7416* (2013.01); *H04N 9/3194* (2013.01); *G09G 2320/068* (2013.01); *G09G 2320/0666* (2013.01); *G09G 2320/0693* (2013.01)

(58) Field of Classification Search
USPC ......... 356/243.1; 382/197, 153–154; 353/69, 353/76; 348/189, 46; 345/156
See application file for complete search history.

(56) References Cited

U.S. PATENT DOCUMENTS

| | | |
|---|---|---|
| 6,527,395 B1 | 3/2003 | Raskar et al. |
| 7,724,379 B2 | 5/2010 | Kawasaki et al. |
| 2004/0141156 A1 | 7/2004 | Beardsley et al. |
| 2005/0078282 A1 | 4/2005 | Tamura |
| 2009/0091623 A1* | 4/2009 | Krogstad ............... G03B 21/53 348/189 |
| 2014/0267624 A1 | 9/2014 | Hara |
| 2015/0043827 A1* | 2/2015 | Hara .................. G01B 11/2504 382/197 |
| 2015/0268035 A1* | 9/2015 | Furihata ................. G01B 11/14 348/136 |
| 2015/0310663 A1* | 10/2015 | Yamasaki ............ G06T 7/0057 348/136 |
| 2016/0140714 A1* | 5/2016 | Hara .................... G06T 7/0018 348/189 |

FOREIGN PATENT DOCUMENTS

| | | |
|---|---|---|
| JP | 2005-512466 | 4/2005 |
| JP | 2005-326247 | 11/2005 |
| JP | 2005-347790 A | 12/2005 |
| JP | 2006-513504 | 4/2006 |
| JP | 2007-309660 | 11/2007 |
| JP | 4230525 | 2/2009 |
| JP | 2010-50540 A | 3/2010 |
| JP | 2011-170174 | 9/2011 |
| JP | 2012-078858 | 4/2012 |

OTHER PUBLICATIONS

International Search Report Issued on Feb. 18, 2014 in PCT/JP2013/085306 filed on Dec. 24, 2013.
Office Action issued on Dec. 21, 2015 in Korean Patent Application No. 10-2015-7016885 with English translation.
Extended European Search Report issued Jun. 14, 2016 in Patent Application No. 13869000.3.

* cited by examiner

COMBINED PATTERN — 30

ROTATION MATRIX R=($r_1$, $r_2$, $r_3$), TRANSLATION VECTOR

REFLECTION POINT ($q_x$, $q_y$, $q_z$)

30

IMAGING SURFACE

IMAGING POINT ($p_u$, $p_v$)

IMAGING CENTER

_US 9,532,020 B2_

CALIBRATION APPARATUS, PROJECTOR AND CALIBRATION METHOD

TECHNICAL FIELD

The present invention relates to a calibration apparatus, a projector and a calibration method, and more specifically, relates to the calibration apparatus for calibrating a projection unit which projects multiple light rays, the projector which includes the projection unit and the calibration apparatus and the calibration method of the projection unit.

BACKGROUND ART

Technologies for calibrating a projection unit which projects multiple light rays are known (refer to, for example, Patent Documents 1 through 3).

However, the technologies disclosed in Patent Documents 1 through 3 do not provide a calibration method for calibrating such a projection unit that includes an optical system which is different from a pinhole optical system that emits multiple light rays from a single specific point (hereinafter, also referred to as "non-pinhole optical system").

SUMMARY OF THE INVENTION

The present embodiment discloses a calibration apparatus for calibrating a projection unit which projects light rays. The calibration apparatus includes an imaging unit configured to take an image of a surface of an object having a location and an attitude, the light rays being projected onto the surface by the projection unit; a location-and-attitude estimation unit configured to estimate the location and the attitude of the surface based on the image; a reflection-point estimation unit configured to estimate, based on the estimated location and the estimated attitude, a reflection point at which one of the light rays is reflected by the surface; and an identification unit configured to identify both a passing point that the one of the light rays passes and a direction in which the one of the light rays passes the passing point, or to identify only the direction, based on a plurality of reflection points that are obtained by the reflection-point estimation unit with respect to a plurality of different locations and/or a plurality of different attitudes of the surface.

According to the present embodiment, not only a projection unit which includes a pinhole optical system but also a projection unit which includes a non-pinhole optical system can be calibrated.

MODE FOR CARRYING OUT THE INVENTION

Figure 1:
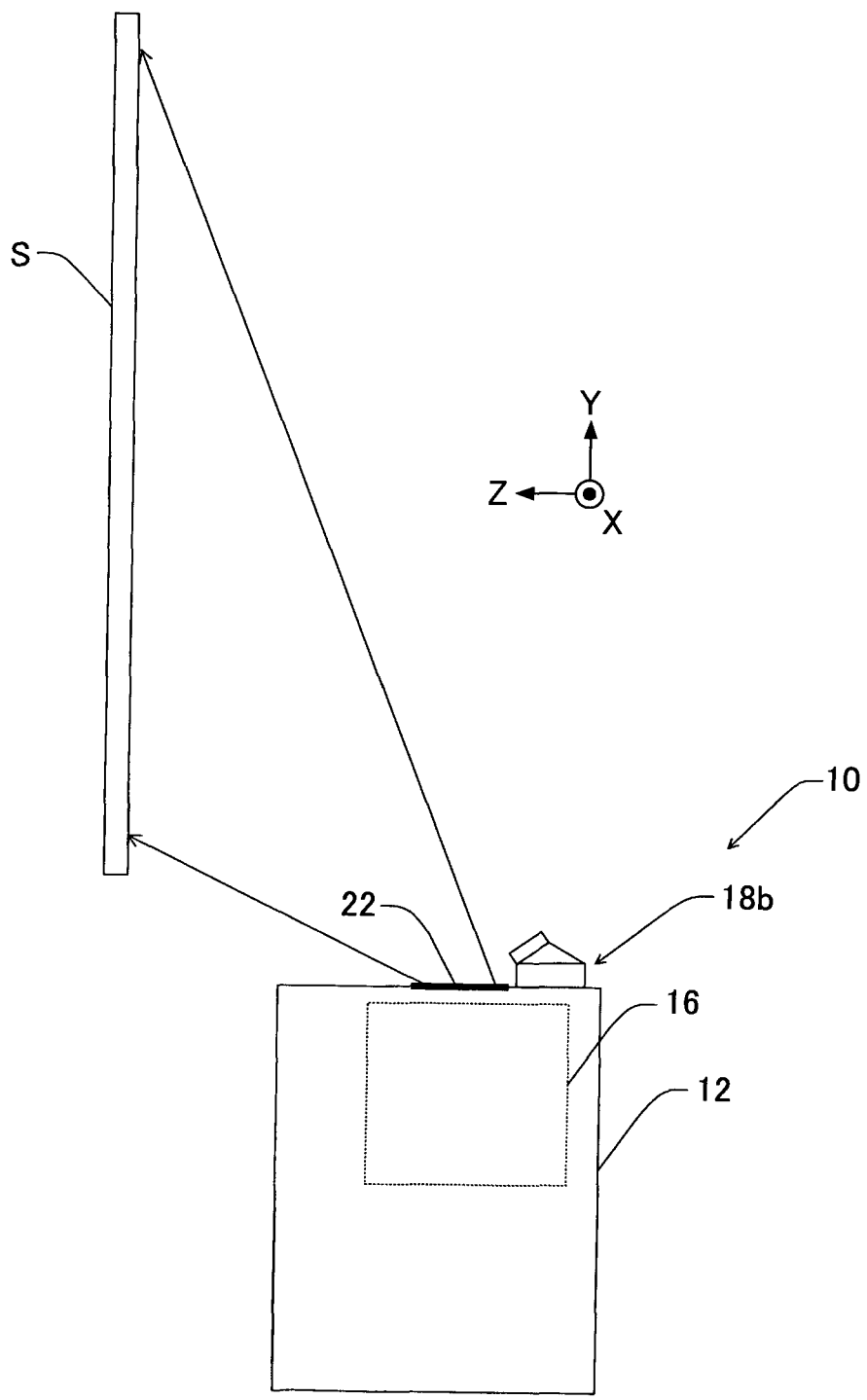
FIG. 1 is a drawing illustrating a configuration overview of a projector according to the present embodiment.

An embodiment of the present invention is explained with reference to FIG. 1 through FIG. 11. In FIG. 1, a side view of a projector 10 according to the present embodiment is shown. In the following description, an X-Y-Z three dimensional orthogonal coordinate system, in which the vertical direction is the Y-axis direction, is used.

The projector 10 is placed, for example, near a hanging-type screen S, at a location obliquely downward from (or, to the −Y side and to the −Z side of) the hanging-type screen S.

The projector 10 includes, for example, a housing 12, a projection unit 16 (refer to FIG. 2), a calibration apparatus 18 (refer to FIG. 3), a geometric-distortion adjustment unit 25 (refer to FIG. 3), a control unit (not shown in figures), etc.

The housing consists of, for example, an approximately-rectangular-shaped box-type member, and includes a light transparent window member 22 in the wall of +Y side, through which the light ray is transmitted.

The projection unit 16 is included, for example, inside the housing 12. The projection unit 16 projects modulated light rays onto the surface (screen surface) of a screen S according to image information from external devices such as a personal computer, a memory medium, etc. The projection unit 16 includes a light source 80, projection optical system 17, etc.

Figure 2:
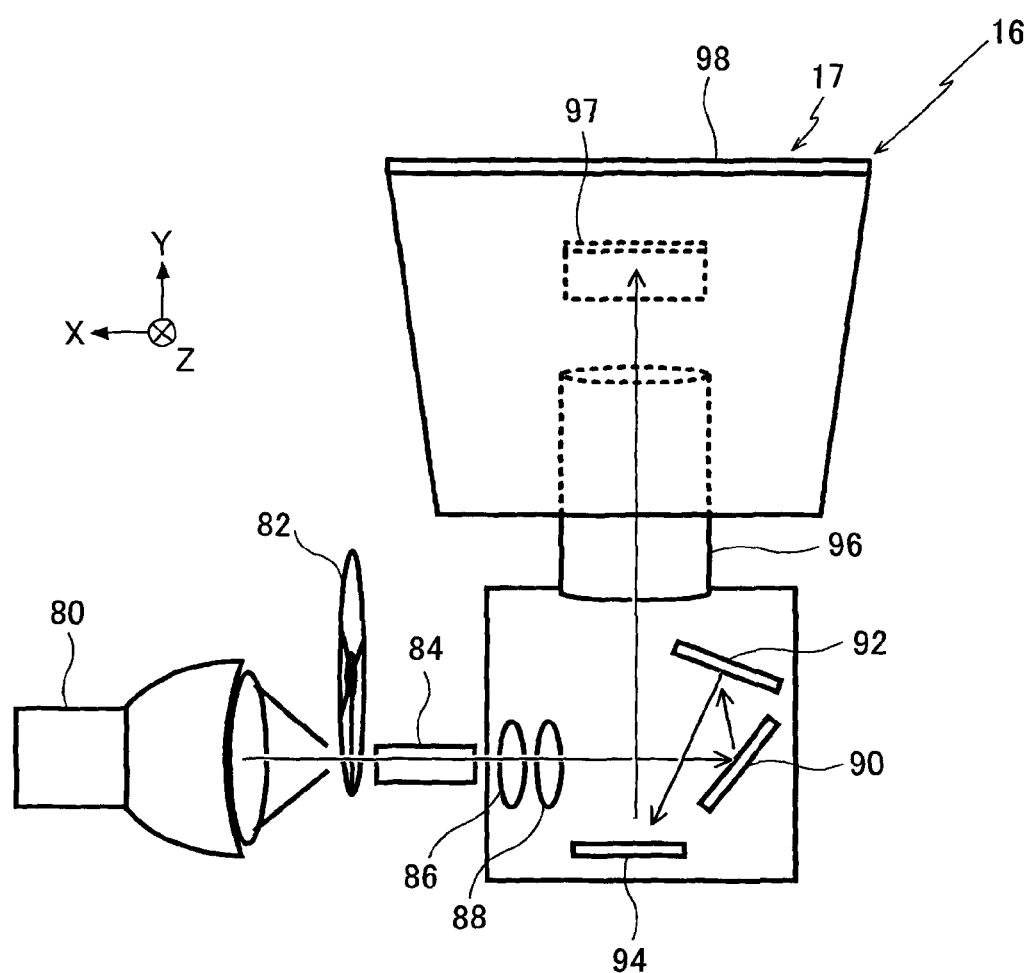
FIG. 2 is a drawing illustrating a projection unit included in the projector.

As shown in FIG. 2, the projection optical system 17 includes, for example, a color wheel 82 as an light-separation unit, a light tunnel 84 as a light-averaging unit, two condenser lenses as light-refraction units 86 and 88, two mirrors as light-reflection units 90 and 92, a DMD (Digital Micromirror Device) 94 as a light-modulation unit, a projection lens 96 as a light-angle-widening-and-image-formation unit, a mirror 97 as a light-reflection unit, and a free-curve surface mirror 98 as a light-angle-widening-and-reflection unit.

The light including multiple color light components emitted from the light source 80 enters the color wheel 82. The light that enters the color wheel 82 is separated into three primary color light components, which are sequentially extracted from the color wheel 82. The individual primary color light components extracted from the color wheel 82 enter the light tunnel 84, after the brightness distribution of which being averaged, enter the condenser lenses 86 and 88. The individual primary color light components, after entering the condenser lenses 86 and 88, the image forming surface of which is adjusted, after being reflected by the mirror 90 and then by the mirror 92, enter the DMD 94. The individual primary color light components, after entering the DMD 94, having been reflected and modulated by the DMD 94 based on the image information, sequentially enter the projection lens 96. The individual primary color light components, upon entering the projection lens 96, whereas the angle of which is widened, are reflected by the mirror 97, and sequentially enter the free-curve surface mirror 98. The individual primary color light components, upon entering the free-curve surface mirror 98, are reflected by the free-curve surface mirror 98 whereby the angle of which is widened by the free-curve surface mirror 98, are sequentially projected in an obliquely upward direction to the +Z, +Y side of the housing 12 (onto the screen S) through a light transparent window member 22 (see FIG. 1). As a result, a color image or a monochrome image is displayed on the screen surface. Note that the route of the light from the light source 80 to the mirror 97 is indicated by direction arrows.

As is understood from the above description, the projection optical system 17 emits multiple light rays from multiple points different from each other on the free-curve surface mirror 98. In other words, the projection optical system 17 is not a pinhole optical system which emits multiple light rays from a specific point, but is a non-pinhole optical system. Note that each of the light rays emitted from the projection optical system 17 corresponds to, for example, a pixel.

Here, the projection unit 16 is configured in such a way that the focal point attitude of the multiple projection light rays (multiple projection light components) is close to the projection unit 16, that is, the projection unit 16 is configured to have a short focus, so that it can display a big color (or monochrome) image on the screen S at a short projection distance. Here, "the projection unit 16 is configured to have a short focus" means that the optical system of the projection unit 16 includes a mirror that has refracting power (for example, the above free-curve surface mirror 98). The refracting power that the mirror has may be a positive or negative power (that is, the mirror may be a concave mirror or a convex mirror). By including a mirror with refracting power in the projection optical system 17, it becomes possible to display a projection image of a size of approximately 80 inches even in the case where the distance from the light transparent window member 22 to the screen S is less than or equal to 50 centimeters.

With this kind of short-focus projector 10, because light can be projected from a location close to the screen S, a situation where: a man or an object sitting between the projector 10 and the screen S causing projection of the light to be interfered with, can be avoided as much as possible.

Figure 3:
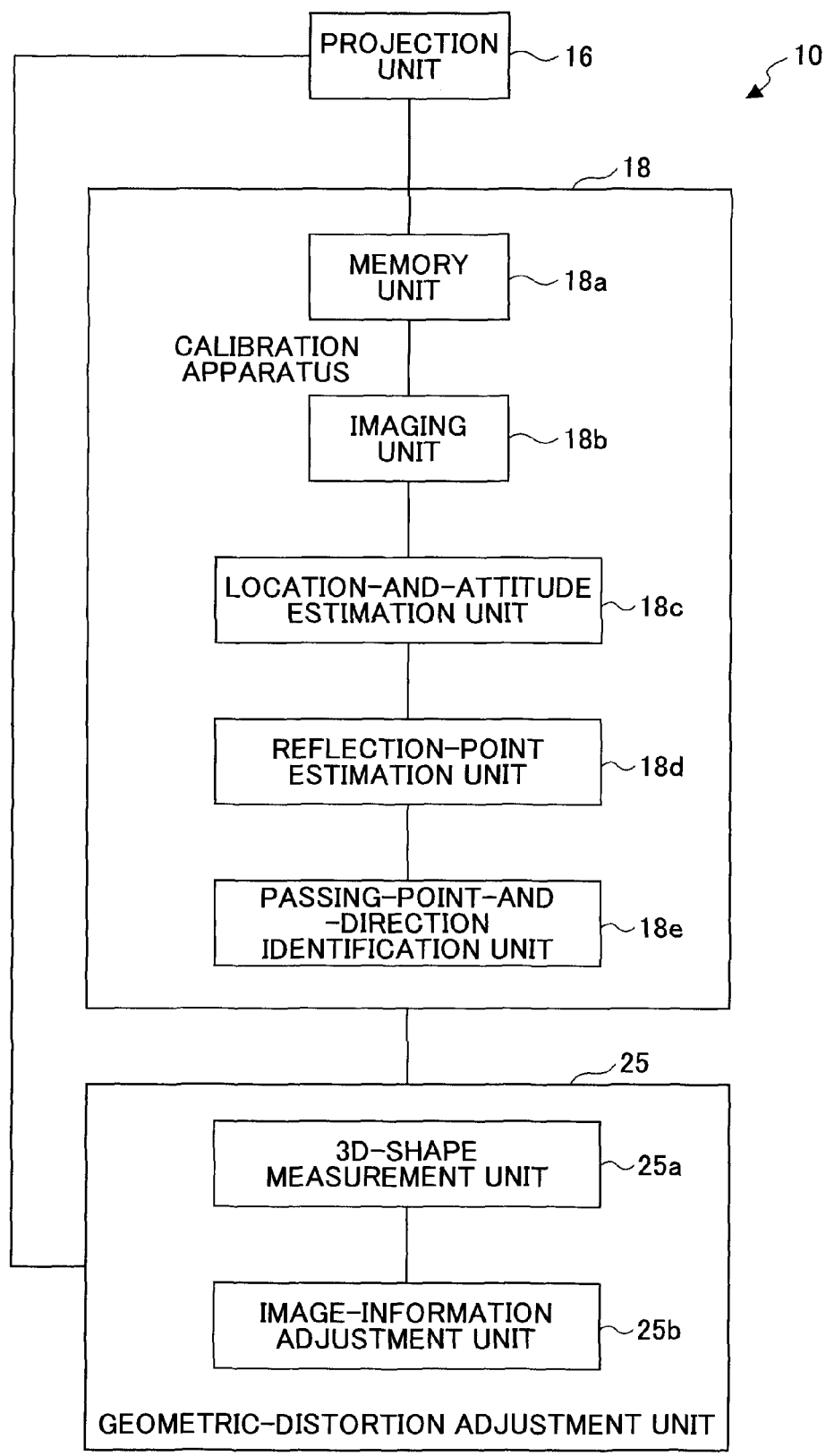
FIG. 3 is a block diagram illustrating an overview of control configuration of the projector.

The calibration apparatus 18 is an apparatus for calibrating the projection unit 16 and includes, for example, as shown in FIG. 3, a memory unit 18a, an imaging unit 18b, a location-and-attitude estimation unit 18c, reflection-point estimation unit 18d, a passing-point-and-direction identification unit 18e, etc.

As the memory unit 18a, for example, a semiconductor memory device (RAM or ROM), a hard disk, an optical disk, etc., are used. In the memory unit 18a, projection patterns, which are projected onto an object used for calibrating the projection unit 16, are stored. The projection unit 16 is capable of reading the projection patterns from the memory unit 18a and of projecting the projection patterns onto the object.

As the imaging unit 18b, for example, a camera, which includes imaging elements such as a CCD or COMS, is used. The imaging unit 18b is placed, for example, on the +Y side surface of the housing 12. The imaging range of the camera is set in such a way that the image of the object, on which the projection pattern is projected by the projection unit 16, can be taken. An image of the object taken by the imaging unit 18b is stored in the memory unit 18a.

The location-and-attitude estimation unit 18c reads from the memory unit 18a the image of the object taken by the imaging unit 18b and estimates the location and the attitude of the object.

The reflection-point estimation unit 18d estimates the reflection points of individual projection light components (light rays) on the object based on the location and the attitude of the object estimated by the location-and-attitude estimation unit 18c.

The passing-point-and-direction identification unit 18e identifies passing points and directions of the individual projection light components between the projection unit 16 and the object based on the reflection points estimated by the reflection-point estimation unit 18d.

The geometric-distortion adjustment unit 25 includes, for example, an 3D-shape measurement unit 25a, an image-information adjustment unit 25b, etc.

The 3D-shape measurement unit 25a measures a 3D shape of the screen surface by triangulation using the projection unit 16, which is calibrated by the calibration apparatus 18, and the imaging unit 18b. As a result, the geometric distortion information of the whole area of the screen surface is detected.

The image-information adjustment unit 25b creates adjustment information for adjusting the geometric distortion of the projection image caused by the distortion of the screen surface based on the measurement result of the 3D-shape measurement unit 25a, and adjusts the image information from the external devices using the created adjustment information. The adjustment information is information for nullifying the distortion of the screen surface by adding a distortion opposite to the distortion of the image information on the screen surface.

In the following, an example of a calibration method of the projection unit 16 using the calibration apparatus 18 is described referring to the flowchart of FIG. 4. This calibration method is performed by causing the above control apparatus to execute the program which specifies the procedure of the calibration method. This program is stored in the memory unit 18a and can be read by the control apparatus.

Figure 5:
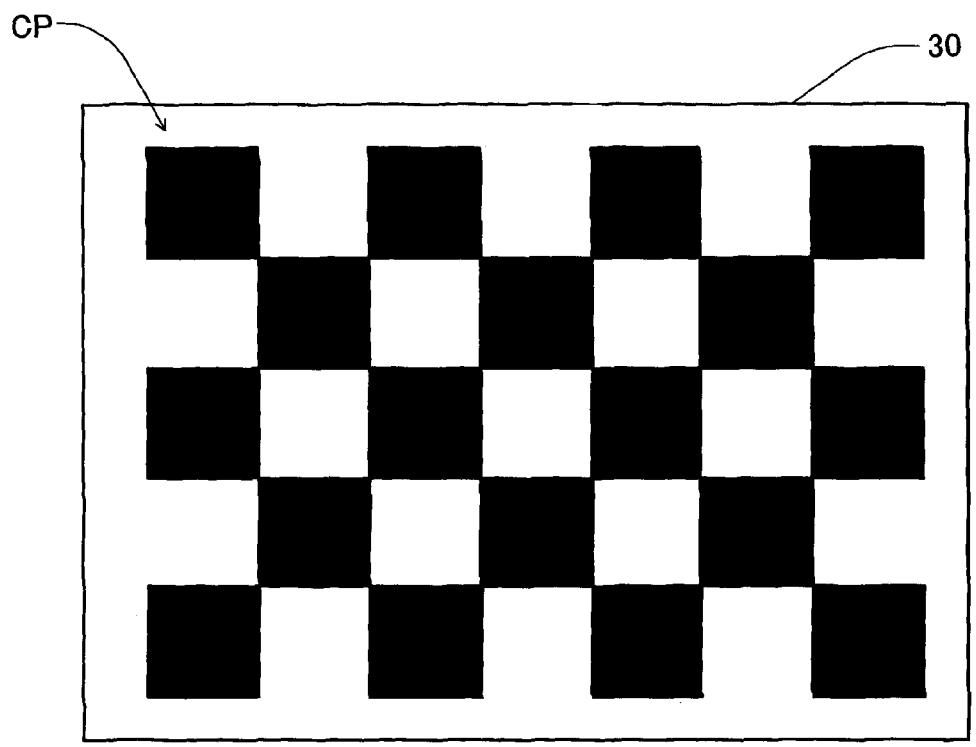
FIG. 5 is a drawing illustrating a checkered pattern for example of a base pattern formed on a surface of a flat plate member.
Figure 6:
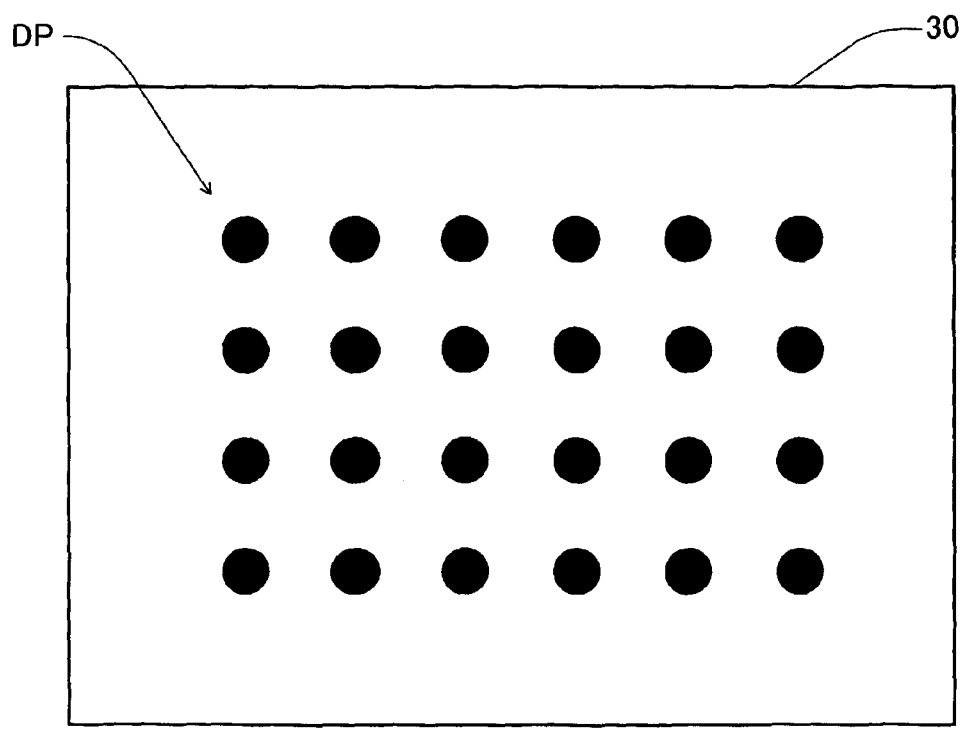
FIG. 6 is a drawing illustrating a dot-pattern for example of a projection pattern projected onto the surface of the flat plate member.

Here, as an example of the above object, a flat plate member 30 (refer to FIG. 5 through FIG. 7), which includes a surface on which the base pattern is formed, is used. As an example of the base pattern, the checkered pattern CP as shown in FIG. 5 is used. As an example of the projection-pattern, the dot-pattern DP which includes multiple dots arranged in a matrix as shown in FIG. 6 is used. In the following, for the sake of convenience, the surface of the flat plate member 30 on which the basis-pattern is formed is also referred to as the "pattern forming surface".

Figure 4:
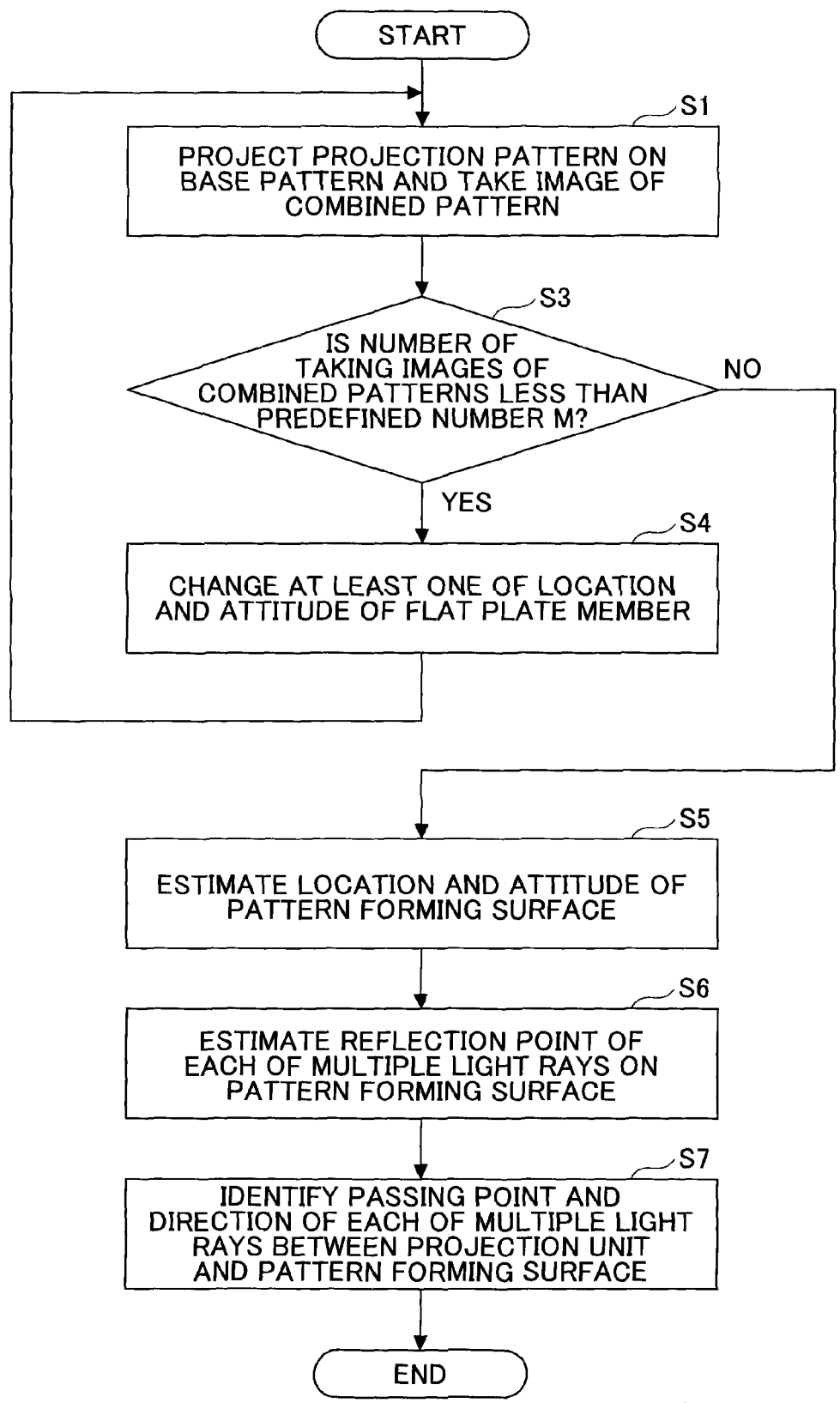
FIG. 4 is a flowchart illustrating a calibration method of the projection unit in which a calibration apparatus is used.
Figure 7:
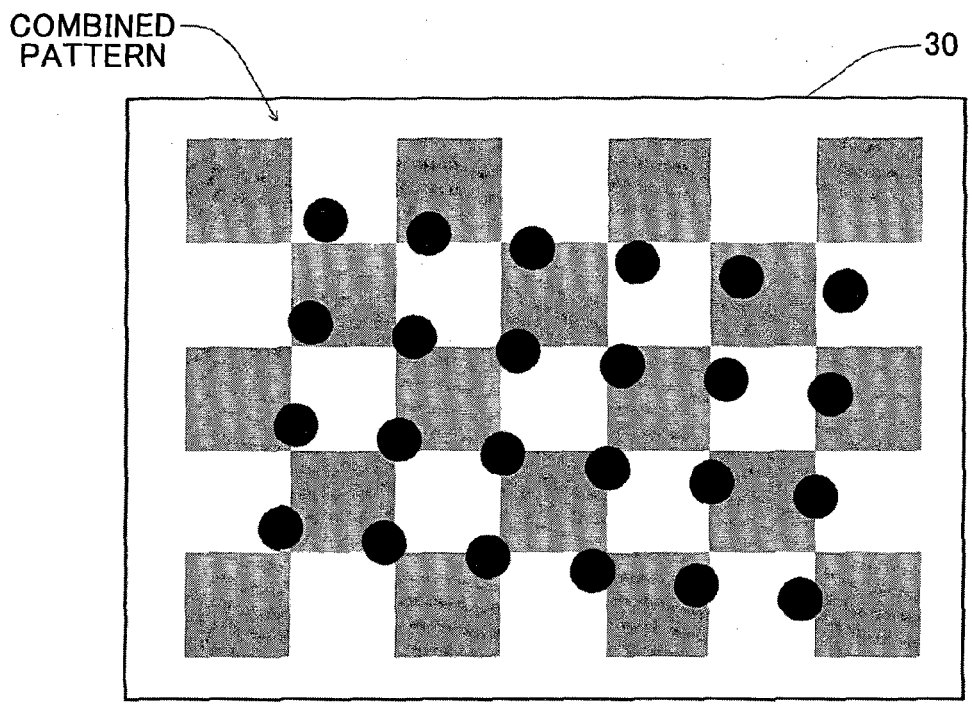
FIG. 7 is a drawing illustrating a situation where the dot-pattern is projected onto the checkered pattern which is formed on the surface of the flat plate member.

First of all, in step S1 in FIG. 4, the projection unit 16 reads the projection pattern from the memory unit 18a and projects the projection pattern onto the base pattern formed on the surface of the flat plate member 30 (refer to FIG. 7). Then, the imaging unit 18b takes an image of the combined pattern formed by projecting the projection pattern onto the base pattern. The image taken of the combined pattern is stored in the memory unit 18a.

In the next step S3, the control apparatus determines whether the number of times the image of the combined pattern is taken is less than a predefined number M (for example, 3), that is, whether the number of times step S1 is performed is less than the predefined number M. In the case where this determination is YES, the step moves to step S4. Note that M is not limited to 3. That is, M may be any positive integer.

Figure 9:
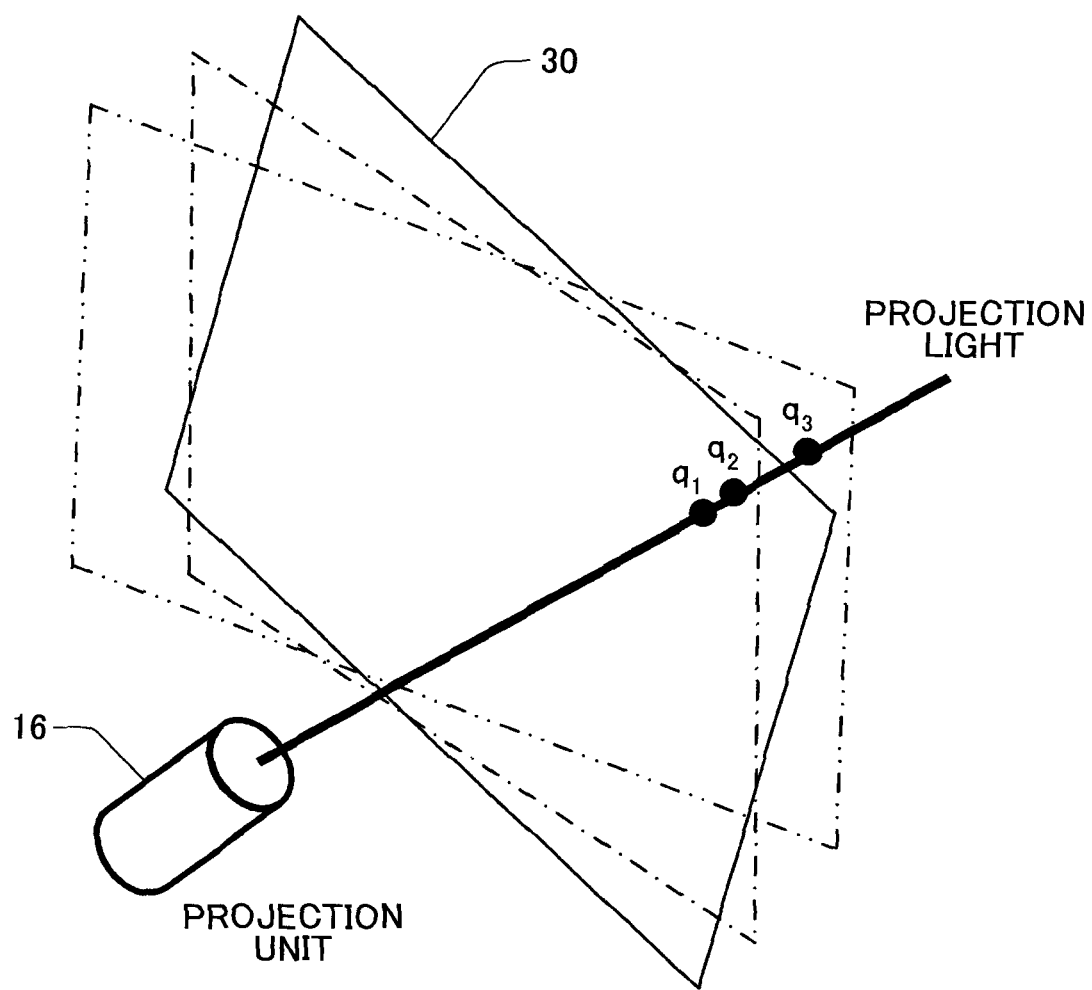
FIG. 9 is a drawing illustrating the reflection points of the light ray on the surface of the flat plate member in three situations in which at least one of the location and the attitude is different from others.
Figure 10:
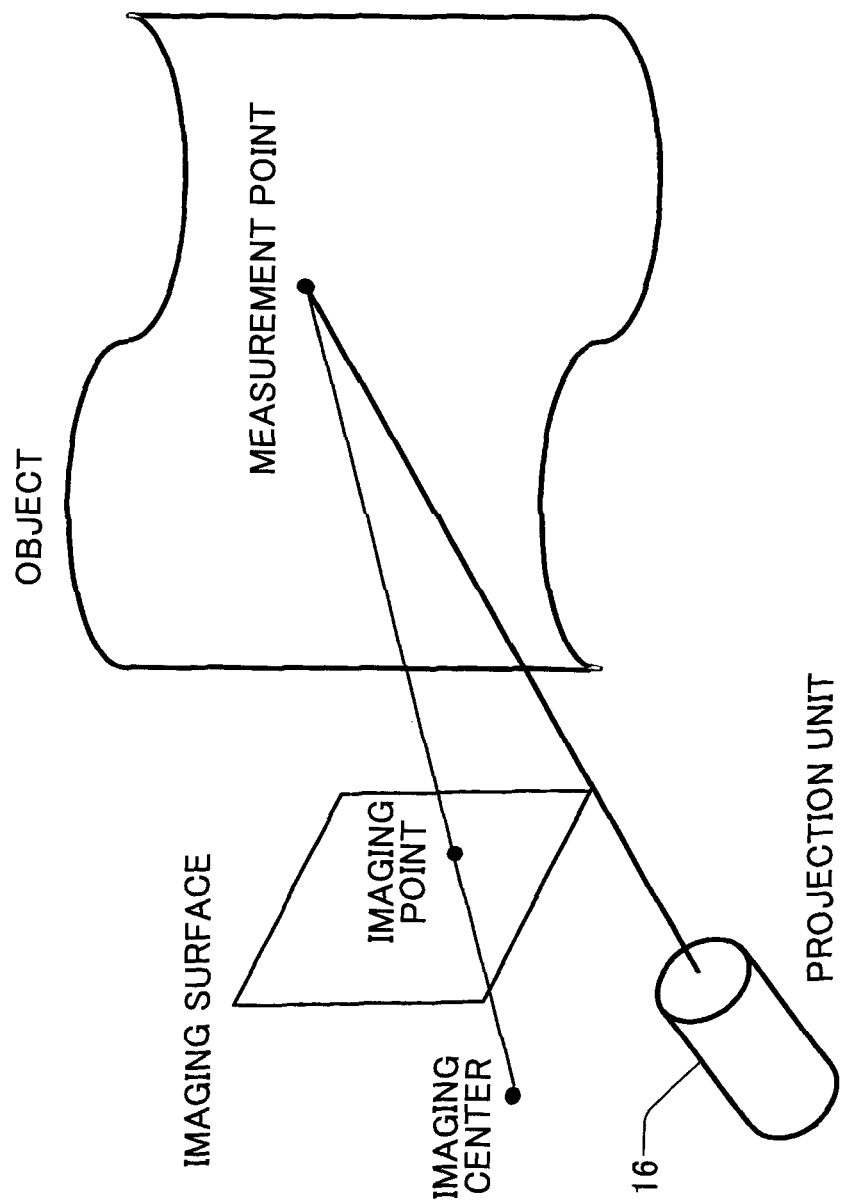
FIG. 10 is a drawing illustrating a method for measuring a 3D shape of an object with triangulation using the projection unit and an imaging unit of a calibration apparatus.

In step S4, the control apparatus changes at least one of the location and the attitude of the flat plate member 30 with respect to the projection unit 16 (refer to FIG. 9). Here, the control apparatus changes at least one of the location and the attitude of the flat plate member 30 by controlling (via an) actuator (not shown in the figures) for operating the flat plate member 30. Note that in FIG. 9, for the sake of convenience, of the projector 10, only the projection unit 16 is shown.

Note that the above change may be performed manually. In other words, the step S4 may not be performed by the control apparatus. In the case where the change is performed manually, it is preferable that a unit (for example, an attitude sensor, an angle sensor, etc.,) be included, which detects that at lease one of the location and the attitude of the flat plate member 30 is changed and transmits the detection result to the control apparatus.

After step S4, the flow returns to step S1. Then, in the case where the determination in step S3 is NO, or in the case where the image of the combined pattern is taken for each of the predefined number M states, in which at least one of the location and the attitude of the flat plate member 30 is different from other states, the flow moves to step S5. In this way, at least one of the location and the attitude of the flat plate member 30 is changed for M−1 times, the projection patterns are projected onto the pattern forming surface by the projection unit 16 both before and after the change of at least one of the location and the attitude, and the images of the combined patterns are taken. As a result, as many as M different images of the combined patterns are stored in the memory unit 18a.

In step S5, the location-and-attitude estimation unit 18c estimates the location and the attitude of the pattern forming surface.

To describe more in detail, the location-and-attitude estimation unit 18c reads the M images of the combined patterns stored in the memory unit 18a. Then, from each of the read images, the location-and-attitude estimation unit 18c extracts locations of characteristic points of the base pattern on the flat plate member 30. Specifically, as shown in FIG. 5, letting the corners of white or black square parts that constitute the checkered pattern CP as the base pattern be the characteristic points, the location-and-attitude estimation unit 18c obtains the two-dimensional locations of the characteristic points on the imaging surface. In order to detect the corners, for example, Harris's corner detection method may be used. Then, from the corresponding relationship between the obtained two-dimensional locations of the characteristic points on the imaging surface and the two-dimensional locations of the characteristic points in the coordinate system on the base pattern, the location-and-attitude estimation unit 18c estimates the location and the attitude of the pattern forming surface. By performing the above procedure for M images of the combined patterns, the location-and-attitude estimation unit 18c estimates the location and the attitude of the pattern forming surface for each of the images.

A specific example of the calculation procedure will be described in the following. Let the location of the $i^{th}$ characteristic point of a combined image on the imaging surface be (ui, vi) and let the location of the $i^{th}$ characteristic point on the pattern forming surface be (xi, yi). Let the number of characteristic points be N. Coefficients of the projective transformation, h1 through h8, which minimize the re-projection error J(h), are calculated by using the following Formula (1).

[Math 1]

$$J(h) = \sum_{i=1}^{N} \left(u_i - \frac{h_1 x_i + h_2 y_i + h_3}{h_7 x_i + h_8 y_i + 1}\right)^2 + \sum_{i=1}^{N} \left(v_i - \frac{h_4 x_i + h_5 y_i + h_6}{h_7 x_i + h_8 y_i + 1}\right)^2 \quad (1)$$

It is assumed that the focal distance of the imaging unit (fu, fv) and the optical axis location (cu, cv) are known. The internal parameter matrix K, which includes the above parameters, is defined by the following Formula (2).

[Math 2]

$$K = \begin{pmatrix} f_u & 0 & c_u \\ 0 & f_v & c_v \\ 0 & 0 & 1 \end{pmatrix} \quad (2)$$

Then, rotation matrix R=(r1, r2, r3) and translation vector t of the pattern forming surface are calculated by the following Formulas (3) through (6).

[Math 3]

$$r_1 \leftarrow K^{-1} \begin{pmatrix} h_1 \\ h_4 \\ h_7 \end{pmatrix} \bigg/ \left\| K^{-1} \begin{pmatrix} h_1 \\ h_4 \\ h_7 \end{pmatrix} \right\| \quad (3)$$

$$r_2 \leftarrow K^{-1} \begin{pmatrix} h_2 \\ h_5 \\ h_8 \end{pmatrix} \bigg/ \left\| K^{-1} \begin{pmatrix} h_2 \\ h_5 \\ h_8 \end{pmatrix} \right\| \quad (4)$$

$$r_3 \leftarrow r_1 \times r_2 \quad (5)$$

$$t \leftarrow K^{-1} \begin{pmatrix} h_3 \\ h_6 \\ 1 \end{pmatrix} \bigg/ \left\| K^{-1} \begin{pmatrix} h_3 \\ h_6 \\ 1 \end{pmatrix} \right\| \quad (6)$$

Note that in the case where the internal parameters of the imaging unit are not known, by using the Zhang's method of camera calibration (Z. Zhang, "A flexible new technique for camera calibration," IEEE Transactions on Pattern Analysis and Machine Intelligence, 22, 11, pp. 1330-1334, 2000.), the internal parameters and, the rotation matrix and the translation vector of the pattern forming surface, can be calculated at the same time.

In the next step S6, the reflection-point estimation unit 18d estimates a reflection point of each of the multiple light rays on the pattern forming surface.

Figure 8:
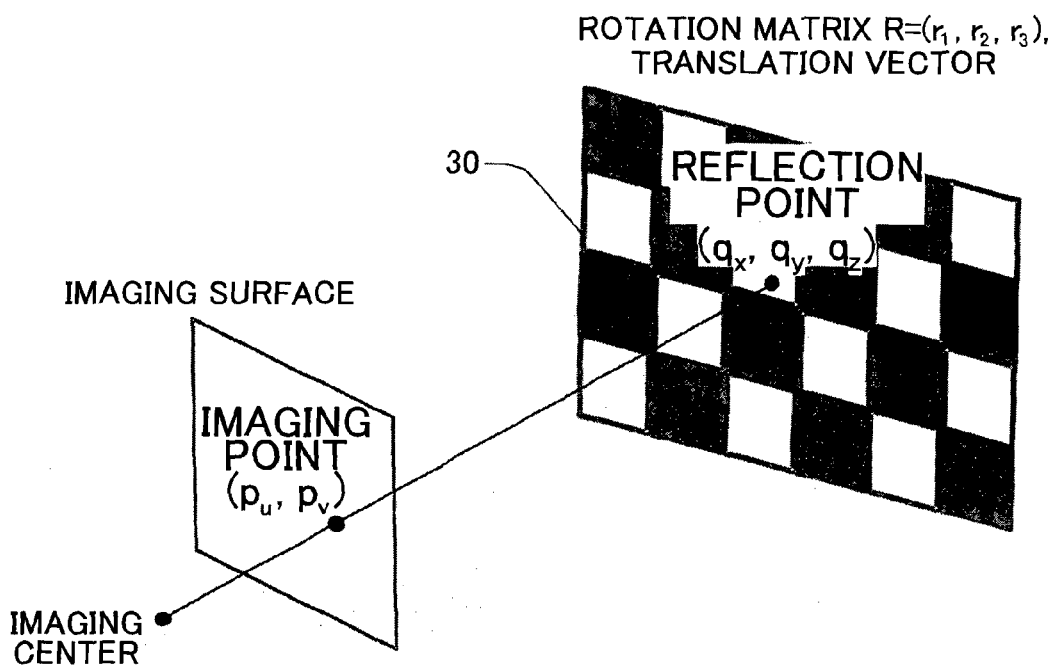
FIG. 8 is a drawing illustrating a relationship between a reflection point of a light ray on the surface of the flat plate member and a point (imaging point) on an imaging surface corresponding to the reflection point.

To describe more in detail, the reflection-point estimation unit 18d reads the M images of the combined patterns stored in the memory unit 18a. Then, from each of the read images, the reflection-point estimation unit 18d estimates reflection points of characteristic points of the projection pattern projected onto the pattern forming surface. Specifically, as shown in FIG. 6, letting the centers of the dots of the dot-pattern DP as the projection pattern be the characteristic points, the reflection-point estimation unit 18d extracts the locations of the characteristic points. Based on the locations of the characteristic points and the location and the attitude of the pattern forming surface estimated in step S5, the reflection-point estimation unit 18d estimates the three-dimensional locations (reflection points) of the characteristic points of the projection pattern on the pattern forming surface. The reflection-point estimation unit 18d performs the above procedure for M images of the combined patterns. As shown in FIG. 8, in order to calculate the three-dimensional location $q=(qx, qy, qz)^T$ of the corresponding point on the pattern forming surface from the two-dimensional location $p=(pu, pv)^T$ of the characteristic point of the projection pattern on the imaging surface, it is only required to solve the equation of the following Formula (7).

[Math 4]

$$\begin{pmatrix} f_u & 0 & c_u - p_u \\ 0 & f_v & c_v - p_v \\ & r_3^T & \end{pmatrix} q = \begin{pmatrix} 0 \\ 0 \\ r_3^T t \end{pmatrix} \quad (7)$$

In the next step S7, the passing-point-and-direction identification unit 18e identifies an equation for a projection light ray based on the three-dimensional locations of the characteristic points of the projection pattern estimated in step S6. Let the reflection points of the same characteristic point of the projection pattern on the pattern forming surface of the flat plate member 30 in the M states, in each of which states at least one of the location and the attitude is different from others, be $q_1$ through $q_M$. Then, by applying the least square method to these multiple reflecting points $q_1$ through $q_M$ to find an equation of a fitting line, the passing-point-and-direction identification unit 18e calculates the passing point and the direction of the projection light ray (refer to FIG. 9). By applying the same process to each of the characteristic points of the projection pattern, the passing point and the direction of the projection light ray corresponding to each of the characteristic points can be calculated.

In this way, the passing point and the direction of the projection light ray for each of the characteristic points can be calculated. Therefore, by projecting the projection pattern from the projection unit 16 onto the object, taking images of the combined patterns using the imaging unit 18b, and using the calculated passing points and directions of the light rays, the 3D-shape measurement unit 25a can measure the 3D-shape of the object by using a principle of triangulation (refer to FIG. 10). As a result, the distortion information of the screen S can be detected.

Figure 11:
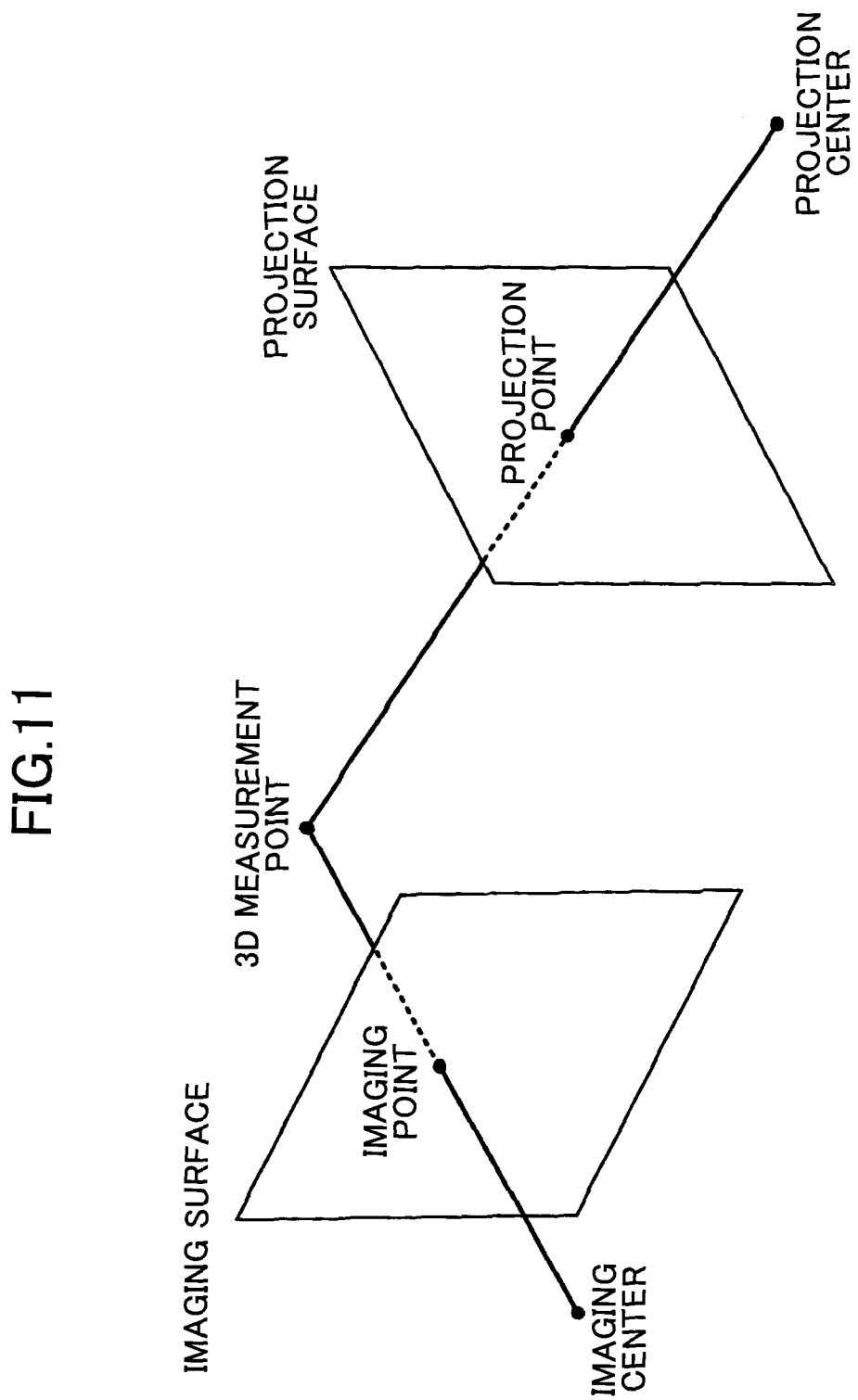
FIG. 11 is a drawing illustrating a principle of the triangulation.

Note that as long as the optical internal parameters of the projection unit 16 and the imaging unit 18b (focal distance, optical axis location, lens distortion, etc.,) and the external parameters of the projection unit 16 and the imaging unit 18b (relative locations and attitudes) are known, the triangulation can be performed using the corresponding relationship between the projection point of the projection unit 16 and the imaging point of the imaging unit 18b (refer to FIG. 11).

Then, the image-information adjustment unit 25b can project a geometric-distortion-free high quality image on the screen S by creating adjustment information for adjusting the geometric distortion of the image projected onto the screen S based on the detected information on the distortion of the screen S, and by adjusting the image information of the original image using the adjustment information.

Note that in the above calibration method, a lens distortion of the camera of the imaging unit 18b is not taken into account. Even in the case where there is a lens distortion in the camera of the imaging unit 18b, by applying the conventional lens distortion adjustment method to the imaging unit 18b, the above calibration method can be used.

The above calibration apparatus 18 according to the present embodiment includes the imaging unit 18b for taking images of the pattern forming surface of the flat plate member 30 onto which multiple light rays from the projection unit 16 are projected; the location-and-attitude estimation unit 18c for estimating the location and the attitude of the pattern forming surface based on the images obtained by taking images of the pattern forming surface; the reflection-point estimation unit 18d for estimating reflection point of each of the multiple light rays on the pattern forming surface based on the estimated location and attitude of the pattern forming surface; and the passing-point-and-direction identification unit 18e for identifying the passing point and the direction of the light ray (projection light) between the projection unit 16 and the pattern forming surface based on the estimated reflection point of each of the multiple light rays.

In this case, the reflection points of each of the multiple light rays before and after a change of at least one of the location and the attitude of the flat plate member 30 can be estimated and the passing point and the direction of each of the multiple light rays can be calculated by, for example, at least one of the location and the attitude of the flat plate member 30 being changed at least once, by multiple light rays being projected onto the pattern forming surface of the flat plate member 30 before and after the change of at least one of the location and the attitude, and by the images of the pattern forming surface being taken.

Note that in the case where the projection unit including the pinhole optical system in which multiple light rays pass through a single specific point is calibrated, the passing point and the direction of each of the multiple light rays may be identified based on the reflection points the same way as in the case where the projection unit 16 including the non-pinhole optical system as described above; or only the direction may be identified based on the above reflection points by assuming the passing point of each of the multiple light rays is the above single specific point.

As a result, in the calibration apparatus 18, not only the projection unit including the pinhole optical system but also the projection unit including the non-pinhole optical system can be calibrated.

In the meantime, the passing-point-and-direction identification unit 18e identifies the passing point and the direction of a light ray by obtaining the fitting line by applying the least square method to the reflection points of each of the multiple light rays on the pattern forming surface before and after the change. In this case, the passing point and the direction of each of the multiple light rays can be obtained easily and with good accuracy.

Also, the projector 10 includes the projection unit 16 for projecting the multiple light rays modulated in accordance with the image information onto the screen surface; the calibration apparatus 18 for calibrating the projection unit 16; and the geometric distortion adjusting unit 25 for measuring the 3D shape of the screen surface by triangulation using the projection unit 16 and the imaging unit 18b of the calibration apparatus 18 and for adjusting the image information based on the measurement result.

In this case, the geometric distortion caused by the screen surface distortion, for example, can be adjusted with good accuracy, and a high quality image, whose geometric distortion is reduced, can be projected onto the screen surface.

Note that the base pattern which is formed on the flat plate member 30 is not limited to the checkered pattern. Also, the projection-pattern which is projected onto the flat plate member 30 is not limited to the dot-pattern. The point is, the base pattern or the projection pattern may be any pattern, as long as those location relations of the multiple characteristic points are known. For example, the base pattern may be a dot-pattern. The projection pattern may be a checkered pattern.

Also, at least one of the base pattern and the projection pattern may be a grid-pattern. In this case, intersection points of the grid-pattern or square areas of the grid-pattern may be used as characteristic points.

Figure 12:
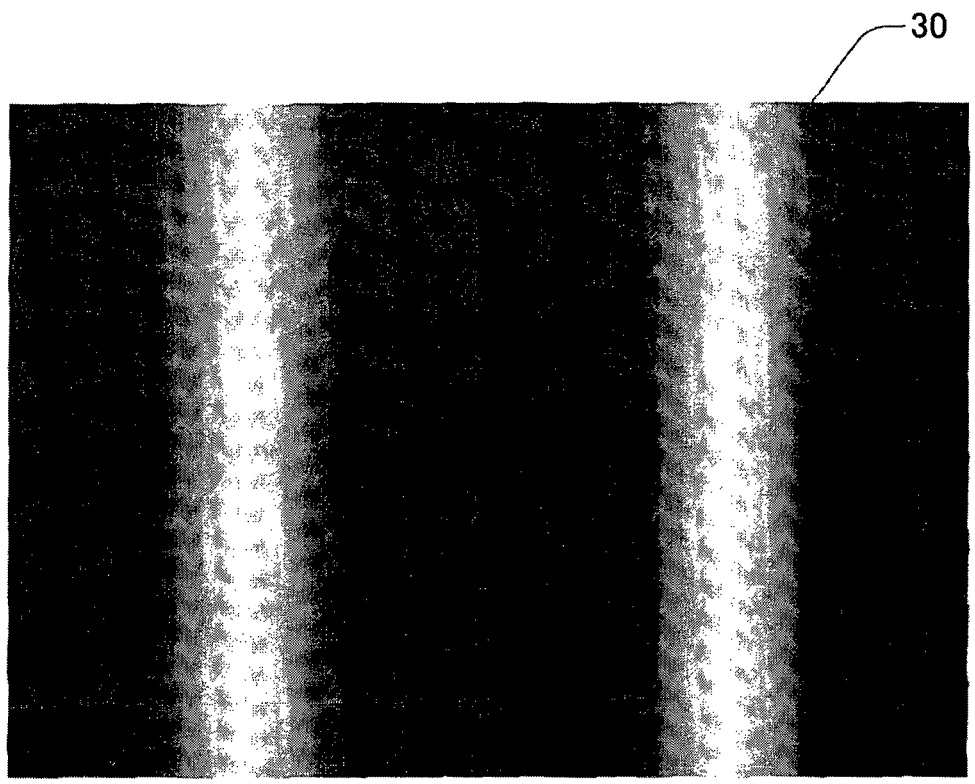
FIG. 12 is a drawing illustrating another example of the base pattern or the projection pattern.

Also, a pattern shown in FIG. 12, whose light-dark changes into a sine-wave pattern, may be used as the base pattern or the projection pattern. Images of this pattern are taken multiple times while the pattern is moved slightly to the right or left, and the sine-wave phases of the pixels are estimated. Likewise, after turning this pattern 90 degrees, images are taken multiple times while the pattern is moved slightly up or down and the sine-wave phases of the pixels are estimated. By doing this, the corresponding relationships between the locations on the projection pattern and the pixels of the images taken are established (the phase shift method), and locations of all of the pixels can be used as characteristic points of the present embodiment.

Also, the above embodiment is a case where the projection unit 16 is of a non-pinhole type and there is no constraint between each of the characteristic points of the projection pattern and the corresponding projection light ray. Even when the projection unit is of a non-pinhole type, there is a case where it can be viewed as a pinhole. Therefore, in the following, a modified embodiment 1 will be described in which the locations and the directions of the projection light rays are identified using this kind of relationship among the characteristic points of the projection pattern (constraint conditions).

The calibration apparatus of the modified embodiment 1 includes the same configuration and the same function as the calibration apparatus 18 of the above embodiment except for the process of the passing-point-and-direction identification unit. In the following, the contents of the process of the passing-point-and-direction identification unit of the modified embodiment 1 will be described.

The passing-point-and-direction identification unit obtains a set of reflection points on the pattern forming surface of the $i^{th}$ characteristic point of the projection pattern estimated by the reflection-point estimation unit 18d $q_1(i)$, $q_2(i)$, $q_M(i)$. Here, let the direction cosine (unit vector of the direction) of the projection light ray corresponding to the $i^{th}$ characteristic point of the projection pattern be e(i) and let the passing point of the projection light ray be a(i). In the case where the pinhole model can be applied to the projection light rays corresponding to the $i^{th}$ characteristic point and the $j^{th}$ characteristic point, the equality a(i)=a(j) holds. By using this, and by letting a set of indexes of the projection light rays, to which the same pinhole model can be applied, be S, the optimization problem shown in the following Formula (8) will be resolved.

[Math 5]

$$\text{minimize} \sum_{i \in S} \sum_{k=1}^{M} \|(I - e(i)e(i)^T)(q_k(i) - a(i))\|^2 \quad (8)$$

$$\text{subject to:} \quad a(i) = a(j) \ (i, j \in S)$$

In other words, after constraining the passing points of the projection light rays to be a single point, the sum of squares of the distances from the line of the projection light ray to the estimated reflection points is minimized. This optimization problem can be solved by the following iterative operation. First, an initial value of e(i) (i∈S) is set. For example, by applying principal component analysis to the estimated reflection points q1(i), q2(i), . . . , qM(i), the direction of the first principal component is set as e(i). Then, a=a(i) (i∈S) is obtained from the following Formula (9).

[Math 6]

$$a \leftarrow \left(\sum_{i \in S} W(i)\right)^{-1} \sum_{i \in S} \left(\frac{W(i)}{M} \sum_{k=0}^{M} q_k(i)\right) \quad (9)$$

$$W(i) = I - e(i)e(i)^T$$

Then, the eigenvector corresponding to the greatest eigenvalue of the following matrix for i∈S is obtained and is substituted into e(i) and Formula (10) is obtained.

[Math 7]

$$\sum_{k=1}^{M} (q_k(i) - a)(q_k(i) - a)^T \quad (10)$$

The update of the passing point a by using Formula (9) and the update of the direction cosine e(i) by using the eigenvalue operation of Formula (10) are iterated until a specific condition is met. As examples of the specific conditions, conditions such as: the updates should be repeated for predefined times; or an amount of change of a parameter resulting from the repetition should become less than a specific threshold value, can be set.

The constraint conditions are not limited to the above examples. For example, symmetric property of the projection light rays with respect to the light axis may be made as a constraint. The above iterative operation cannot be applied in the case of general constraints, and the solution is obtained by applying the non-linear optimization method with general constraint conditions.

According to the modified embodiment 1, the location and the direction of the projection light ray can be robustly identified from a small number of images taken because the least squares estimation is performed under the constraint condition which is held among the projection light rays.

Also, as described in the following modified embodiment 2, the location and the direction of the projection light ray may be identified by minimizing both the distance of the estimated reflection point of each of the projection light rays from the line and the amount of change of the location and direction of the projection light ray. Even in the case where a constraint among the projection light rays cannot be applied, in an optical system in which things change in a sufficiently smooth manner, locations and directions of two spatially close projection light rays may take similar values. Using this nature of the optical system, the location and direction of the projection light ray will be robustly identified.

The calibration apparatus of the modified embodiment 2 includes the same configuration and the same function as the calibration apparatus 18 of the above embodiment except for the process of the passing-point-and-direction identification unit. In the following, the contents of the process of the passing-point-and-direction identification unit of the modified embodiment 2 will be described.

First, the passing-point-and-direction identification unit of the modified embodiment 2 obtains estimated reflection points of the projection pattern estimated by the reflection-point estimation unit. As the projection pattern, for example, a pattern in which characteristic points are lined up in the form of a matrix as shown in FIG. 5 and FIG. 6 is used. Estimated incident location in the $k^{th}$ taken image of the characteristic point of row i column j is denoted by $q_k(i,j)$, a direction cosine (unit vector of the direction) of the projection light ray corresponding to the characteristic point of row i column j is denoted by $e(i,j)$, and the passing point is denoted by $a(i,j)$. Using these notations, an evaluation function is configured as shown in Formula (11).

[Math 8]

$$J(e, a) = \sum_i \sum_j \sum_{k=1}^M \|(I - e(i, j)e(i, j)^T)(q_k(i, j) - a(i, j))\|^2 + \Phi(e, a) \quad (11)$$

The first term of Formula (11) is the sum of squares of distances from the line of the projection light ray to the estimated reflection points, and the second term of Formula (11), $\Phi(e, a)$ is the regularization term. It can be considered that the regularization term provides penalty to non-smoothness of the direction cosine and the passing point of the projection light ray. For example, as shown in Formula (12), $\Phi(e, a)$ can be set as sum of squares of second order differentials of the direction cosine $e(i, j)$ in the direction of i.

[Math 9]

$$\Phi(e, a) = \sum_i \sum_j \|e(i-1, j) - 2e(i, j) + e(i+1, j)\|^2 \quad (12)$$

The same idea can be applied for the direction of j. Also, it is possible to set the same regularization term for the passing point $a(i, j)$. By using the regularization term which is configured to be as described above, and by obtaining $e(i, j)$ and $a(i, j)$ which minimize the above Formula (11), the projection light rays whose passing points and directions change smoothly in terms of space can be obtained. Note that regarding the minimization of Formula (11), non-linear optimization methods such as the steepest descent method, the Newton method, etc., can be used.

According to the modified embodiment 2, by minimizing both the distance from the line of each of the projection light rays to each of the estimated reflection points and the amount of change of the locations and directions among the projection light rays, the passing points and directions of the projection light rays can be robustly identified from a small number of images taken.

Also, as will be described as the modified embodiment 3 in the following, the passing points and directions of the projection light rays may be robustly identified by applying a filtering process to the passing point and direction of each of the projection light rays.

Figure 13:
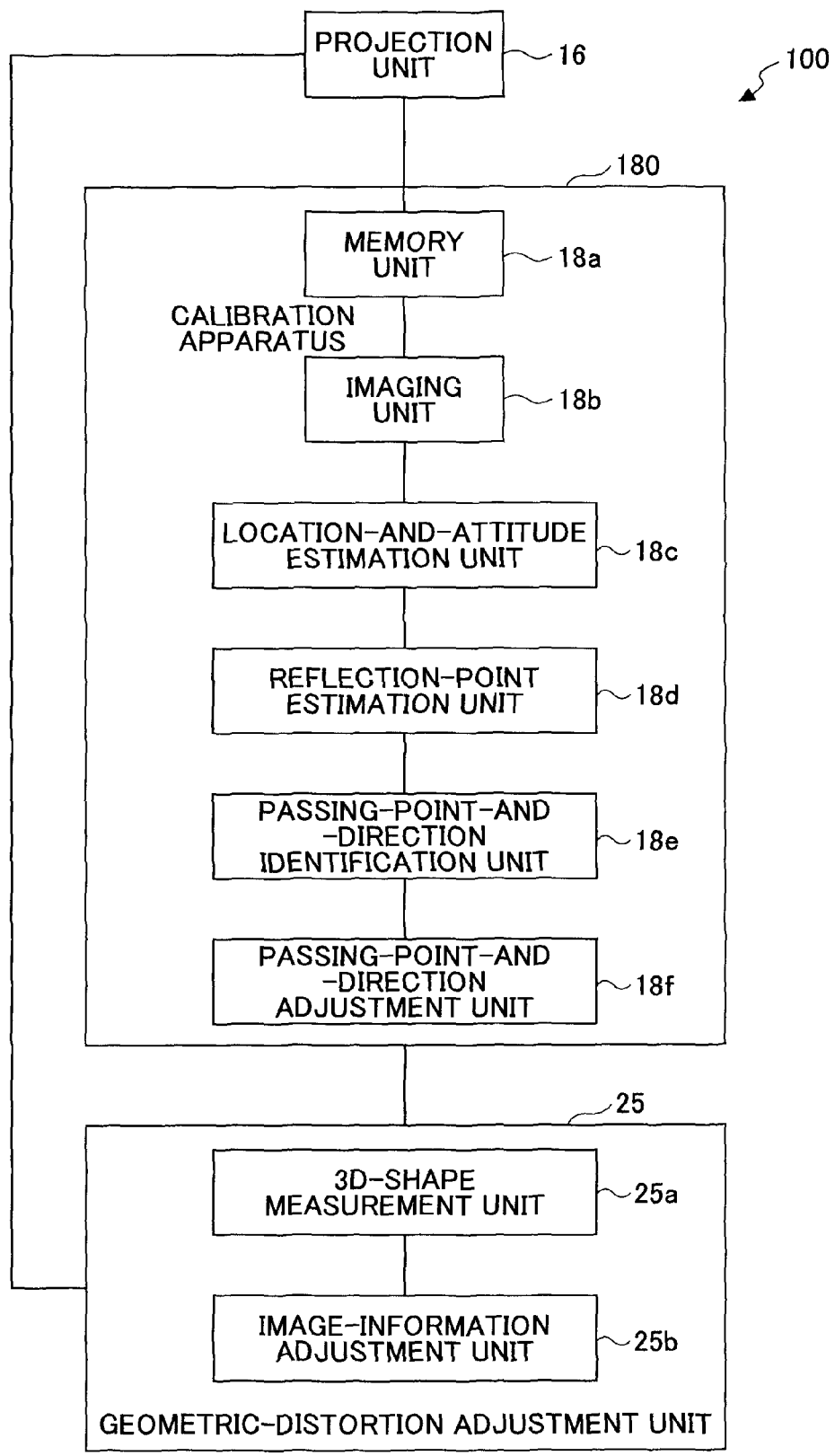
FIG. 13 is a block diagram illustrating an overview of a control configuration of the projector of the modified embodiment 3.

In FIG. 13, a configuration overview of the calibration apparatus 180 according to the modified embodiment 3 is shown. The calibration apparatus 180 is different from the calibration apparatus 18 of the above embodiment in that it includes a passing-point-and-direction adjusting unit 18f.

Figure 14:
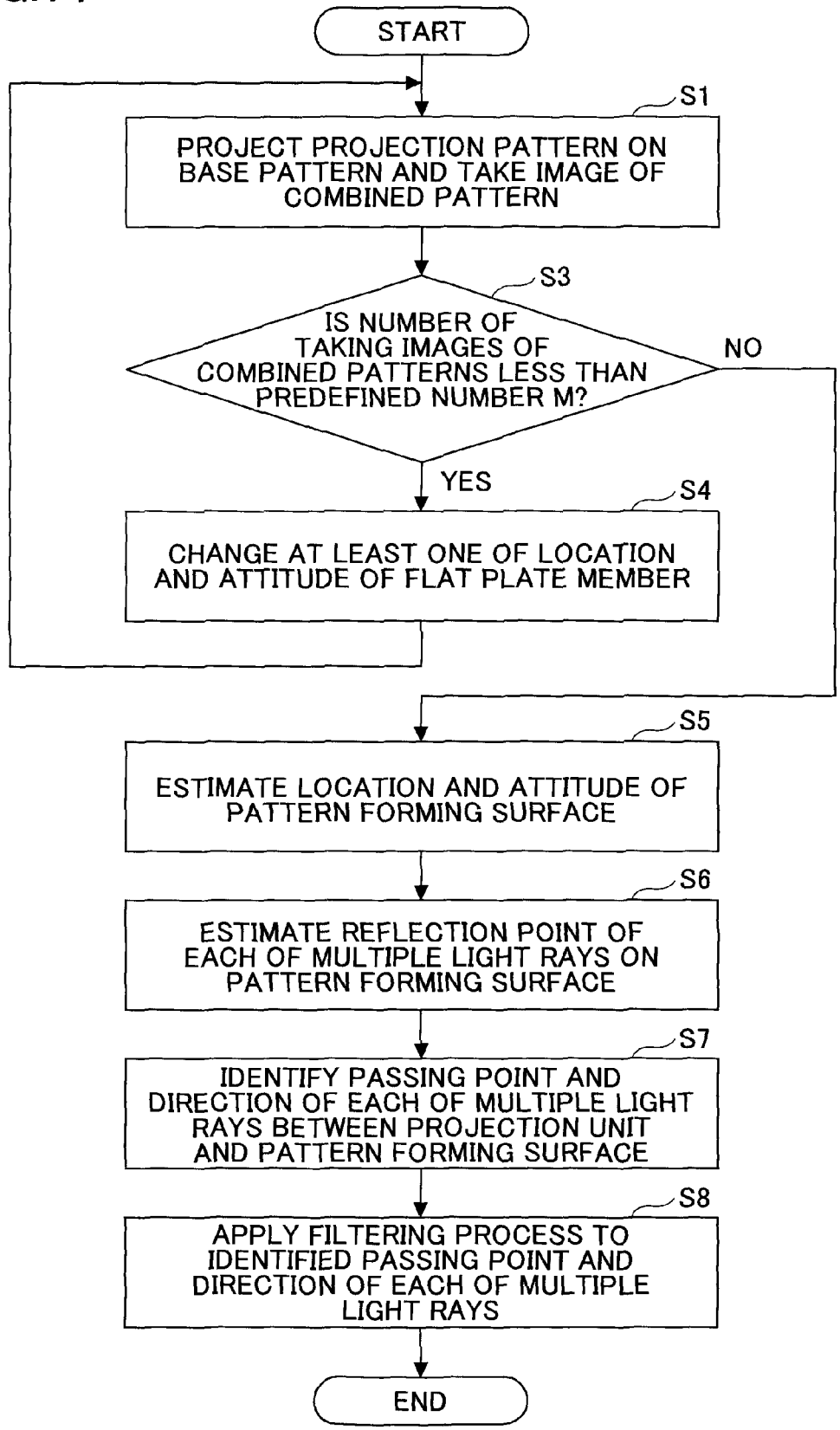
FIG. 14 is a flowchart illustrating a calibration method of the projection unit using the calibration apparatus of the modified embodiment 3.

In FIG. 14, a flowchart illustrating a calibration method of the projection unit 16 using the calibration apparatus 180 is shown. The flowchart of FIG. 14 is a flowchart of FIG. 4 to which step S8 is added.

Figure 15:
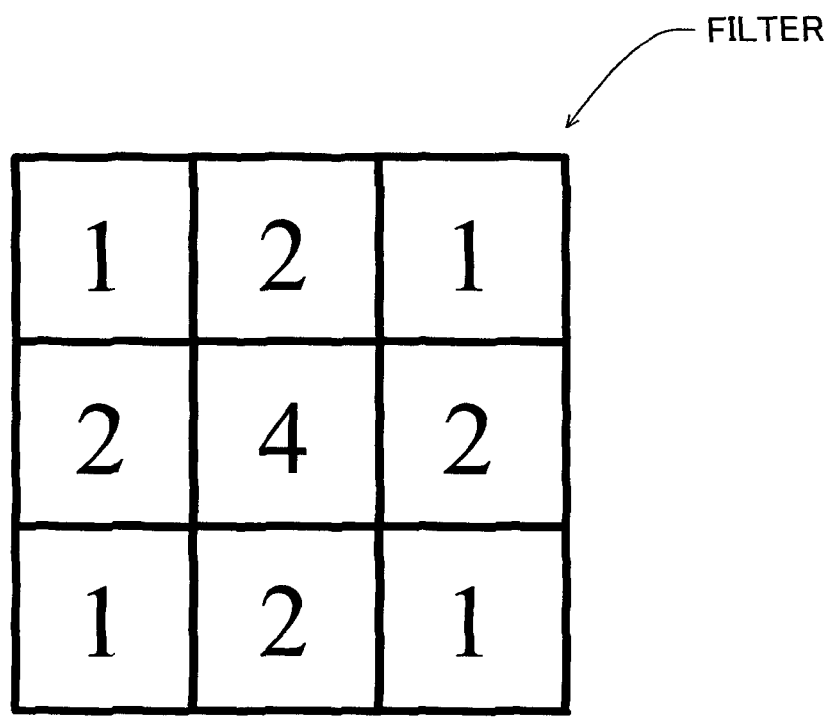
FIG. 15 is a drawing illustrating an example of a filter used in a filtering process by the calibration apparatus of the modified embodiment 3.

In step S8, the passing-point-and-direction adjusting unit 18f adjusts the passing point and direction of each of the projection light rays identified by the passing-point-and-direction identification unit 18e. As the adjusting method, a filtering process can be used. The same as the above modified embodiment 2, it is assumed that the characteristic points of the projection pattern are lined up in the form of a matrix and that the direction cosine $e(i, j)$ and the passing point $a(i, j)$ of the projection light ray corresponding to the characteristic point of row i column j are obtained. Then, by applying a filter of coefficients shown in FIG. 15 to these, errors can be reduced because of smoothing. The filter which is applied is not limited to a linear filter, and by applying non-linear filters such as a Median filter, a E filter, a Bilateral filter, etc., smoothing can be performed while keeping the steep change.

According to the modified embodiment 3, by applying a filtering process to the passing point and direction of each of the projection light rays, the location and the direction of the projection light ray can be robustly identified from a small number of images taken.

Note that, for example, in the case of calibrating the projection unit including a pinhole optical system and only the direction of each of the projection light rays is identified by the passing-point-and-direction unit 18e, it may be possible that the filtering process is also applied only to the identified direction.

Also, in the above embodiment and each of the modified embodiments, the calibration apparatus is installed in the projector 10. The calibration apparatus, not being limited to the above configuration, may be installed in, for example, a 3D scanner which includes a projection unit for projecting multiple light rays. In this case, too, the three dimensional shape of an object whose shape is unknown can be measured easily and with good accuracy by triangulation using the projection unit and the imaging unit of the calibration apparatus (refer to FIG. 10).

Also, in the above embodiment and each of the modified embodiments, only one flat plate member 30 is used while calibrating the projection unit by using the calibration apparatus, but multiple flat plate members 30 may be used. Basically, it is only necessary that the image of the combined pattern on the pattern forming surface of the flat plate member 30 be taken in each of the states in which at least one of the locations and the attitudes of the flat plate member 30 with respect to the projection unit 16 are different from each other.

Also, the flat plate member 30 is used as the object onto which multiple light rays are projected by the projection unit 16, but it is not limited to this configuration. The point is that it is preferable that an object which includes a flat surface be used. And it is more preferable that the base pattern be formed on this flat surface.

Also, it is assumed that the surface onto which projection light rays are projected is, for example, the surface of the hanging-type screen S, but it is not limited to this configuration. For example, the surface may be a surface of a screen S which is fixed on a wall of a building, a wall surface of a building, a surface of a cloth, a surface of a panel, a surface of a board, a surface of a windshield of a car, etc.

The projection unit may not be of a short focus type. In this case, an MEMS mirror, a galvano-mirror, etc., may be used in place of the mirror with refracting power (for example, the above free-curve surface mirror 98).

Also, the configuration of the projection unit is not limited to the above configuration and can be modified accordingly. For example, the light from the light source 80 is modulated at the DMD 94 based on the image signals, but the light source 80 may be modulated and driven based on the image signals. In this case, in place of the DMD 94, a MEMS scanner with two axises, a galvano-scanner with two axises, multiple MEMS mirrors, etc., may be used. Also, in place of the DMD 94, a transparent-type liquid crystal panel, a reflection-type liquid crystal panel, etc., may be used.

The present application is based on and claims the benefit of priority of Japanese Patent Application No. 2012-286438 filed on Dec. 28, 2012.

DESCRIPTION OF THE REFERENCE NUMERALS

10 Projector
16 Projection unit
18 Calibration unit
18b Imaging unit
18c Location-and-attitude estimation unit
18d Reflection-point estimation unit
18e Passing-point-and-direction identification unit (Identification unit)
18f Passing-point-and-direction adjustment unit (Adjustment unit)
25 Geometric distortion adjustment unit
CP Checkered Pattern (Base pattern)
DP Dot Pattern (Projection Pattern)

RELATED ART DOCUMENT

Patent Document 1: Japanese Patent Application Publication No. 2001-320652
Patent Document 2: Japanese Patent Application Publication No. 2005-326247
Patent Document 3: Japanese Patent No. 4230525

The invention claimed is:

1. A calibration apparatus for calibrating a projector which projects light rays, the calibration apparatus comprising:
an imaging device configured to take an image of a surface of an object having a location and an attitude, the light rays being projected onto the surface by the projector; and
circuitry configured to
estimate the location and the attitude of the surface based on the image,
estimate, based on the estimated location and the estimated attitude, a reflection point at which one of the light rays is reflected by the surface, and
identify both a passing point that the one of the light rays passes and a direction in which the one of the light rays passes the passing point, or to identify only the direction, based on a plurality of reflection points that are obtained by the circuitry with respect to a plurality of different locations or a plurality of different attitudes of the surface, wherein
at least one of the location and the attitude of the object with respect to the projector is changed at least once, the light rays being projected onto the surface before and after the at least one change of the at least one of the location and the attitude.

2. The calibration apparatus as claimed in claim 1, wherein the imaging device takes a first image of the surface before the at least one change and takes a second image of the surface after the at least one change,
wherein the circuitry estimates a first location and a first attitude of the surface based on the first image of the surface taken before the at least one change, and estimates a second location and a second attitude of the surface based on the second image of the surface taken after the at least one change,
wherein the circuitry estimates a first reflection point of the one of the light rays based on the estimated first location and the estimated first attitude of the surface before the at least one change and estimates a second reflection point of the one of the light rays based on the estimated second location and the estimated second attitude of the surface after the at least one change, and
wherein the circuitry identifies both the passing point and the direction, or identifies only the direction, based on the estimated first reflection point and the estimated second reflection point.

3. The calibration apparatus as claimed in claim 2, wherein the circuitry identifies both the passing point and the direction, or identifies only the direction, by obtaining a fitting line by applying a least square method to the estimated first reflection point and the estimated second reflection point.

4. The calibration apparatus as claimed in claim 2, wherein there is a predefined constraint condition among the light rays whereas the circuitry identifies both the passing point and the direction, or identifies only the direction, by calculating a line whose distances from the first reflection point and the second reflection point are minimized.

5. The calibration apparatus as claimed in claim 2, wherein the circuitry identifies both the passing point and the direction, or identifies only the direction, by calculating a line, whose distances from the first reflection point and the second reflection point are minimized, wherein the amounts of the changes of the plurality of reflection points and the plurality of different attitudes of the surface are minimized.

6. The calibration apparatus as claimed in claim 1, wherein
the circuitry is configured to apply a filtering process to both the identified passing point and the identified direction, or only to the identified direction.

7. The calibration apparatus as claimed in claim 1, wherein a predefined base pattern is formed on the surface.

8. The calibration apparatus as claimed in claim 1, wherein the light rays, which are modulated in accordance with a predefined projection pattern, are projected onto the surface.

9. The calibration apparatus as claimed in claim 8, wherein the one of the light rays corresponds to a pixel.

10. The calibration apparatus as c aimed in claim 1, wherein the surface is a flat surface.

11. A device for projecting light rays modulated in accordance with image information on a projection surface, the device comprising:
the projector configured to project the light rays; and
the calibration apparatus for calibrating the projector as claimed in claim 1.

12. The device as claimed in claim 11, further comprising:
geometric distortion circuitry configured to measure a three dimensional shape of the projection surface by triangulation using the projector and the imaging device of the calibration apparatus, and to adjust a geometric distortion of the image which is projected onto the projection surface based on the measurement result.

13. An apparatus comprising:
circuitry configured to
estimate, based on an image taken of a surface of an object having a location and an attitude, light rays being projected onto the surface by a projector, the location and the attitude of the surface,
estimate, based on the estimated location and the estimated attitude, a reflection point at which one of the light rays is reflected by the surface, and
identify both a passing point that the one of the light rays passes and a direction in which the one of the light rays passes the passing point, or to identify only the direction, based on a plurality of reflection points that are obtained by the circuitry with respect to a plurality of different locations or a plurality of different attitudes of the surface, wherein
at least one of the location and the attitude of the object with respect to the projector is changed at least once, the light rays being projected onto the surface before and after the at least one change of the at least one of the location and the attitude.

14. A method comprising:
estimating, based on an image taken of a surface of an object having a location and an attitude, light rays being projected onto the surface by a projector, the location and the attitude of the surface:
estimating, based on the estimated location and the estimated attitude, a reflection point at which one of the light rays is reflected by the surface; and
identifying both a passing point that the one of the light rays passes and a direction in which the one of the light rays passes the passing point, or identifying only the direction, based on a plurality of reflection points that are obtained with respect to a plurality of different locations or a plurality of different attitudes of the surface, wherein
at least one of the location and the attitude of the object with respect to the projector is changed at least once, the light rays being projected onto the surface before and after the at least one change of the at least one of the location and the attitude.

* * * * *